Patented Nov. 5, 1940

2,220,117

UNITED STATES PATENT OFFICE 2,220,117

METHOD OF MAKING CADMIUM SULPHIDE PIGMENTS

James J. O'Brien, Baltimore, Md., assignor to The Glidden Company, Cleveland, Ohio, a corporation of Ohio No Drawing. Application January 5, 1939, Serial No. 249,413

4 Claims. (Cl. 134—58)

This invention relates to the manufacture of cadmium sulphide pigments and more particularly relates to the production of such pigments using cadmium sulphate solutions.

In the process of making cadmium sulphide and allied pigments one of the principal raw materials is cadmium sulphate. As pure cadmium can be obtained on the market in the form of the metal, at a reasonable figure, whereas the pure sulphate is not readily obtainable, solutions of cadmium sulphate are generally made by the action of sulphuric acid on the metal. Hot dilute acid slowly attacks cadmium with evolution of hydrogen, but the solution at best is slow. The hydrogen, of course, represents a more or less serious fire hazard, depending on plant conditions.

I have found that the solution of the cadmium metal can be accelerated tremendously by the use of some nitric acid with the sulphuric acid. The nitric acid is reduced during the reaction, a large amount of ammonia being formed that is vaporized during the process. The amount of nitric acid used is ordinarily such that cadmium nitrate is not formed, all of the metal dissolved being dissolved forming cadmium sulphate. The nitric acid acts as an oxidizing agent, and this probably accounts for the large amount of ammonia and other volatile nitrogen compounds formed during the reaction.

It has been found that a cadmium sulphate solution neutral to methyl orange is desirable in the production of cadmium sulphide pigments, better results being obtained when such a solution is used than if an acid solution is used. This neutrality can be produced by treatment of the acid solution wtih alkalies, alkali metal carbonates, etc., but soluble salts are formed in such a case. If these soluble salts are present the size of pigment aggregates is increased, and the pigment has a weaker tinting strength. Cadmium oxide can be used to neutralize, but is expensive.

It has been found that if an excess of metal is used the resulting solution is neutral to methyl orange, and is excellently suited for the production of cadmium sulphide pigments. When the cadmium sulphate solution is prepared with an excess of metal, better pigment is produced than when no such excess is used.

As previously pointed out the amount of nitric acid is preferably such that cadmium nitrate is not formed. The proportion of nitric to sulphuric acid may, however, vary over a considerable range, and may be such that either a nitrate free solution results or one in which some volatile nitrates are formed, such as disclosed in my copending application Serial No. 187,665, filed January 29, 1938. For example, 1 part by weight of 42° Baumé nitric acid to 4.37 to 4.55 parts by weight of 60° Baumé sulphuric acid, and 1 part by weight of 38° Baumé nitric acid to 3.68 parts of 60° Baumé sulphuric acid will give a nitrate free solution while 1 part by weight of 38° Baumé nitric acid to 3.48 parts of 60° sulphuric acid gives a solution containing some nitrates, and 1 part by weight of 42° Baumé nitric acid to 3.48 parts by weight of 60° sulphuric acid gives a solution high in nitrates. The amount of nitric acid for the present invention will ordinarily be 10–30% of the sulphuric acid by weight.

Example I

190# of 38° Baumé nitric acid and 700# of 60° Baumé sulphuric acid (1:3.68), were mixed and diluted with 240 gallons of water, 800# of cadmium metal was then added and heat applied, after the reaction started considerable heat was evolved and the solution boiled. The temperature was 180° to 212° F. and the reaction was complete in about 4 hours. The resulting solution was neutral to methyl orange and free of nitrates. The cadmium sulphate solution thus prepared was purified by treatment with potassium permanganate to remove manganese and iron and the solution standardized to 35° Baumé. 266 gallons of this cadmium sulphate solution was then precipitated with 710 gallons of a 15.5° Baumé barium sulphide solution. The precipitate was filtered, washed, ground and calcined to produce a yellow cadmium lithopone.

Numerous tests were made using varying ratios of nitric acid to sulphuric acid to show the effect of varying amounts of nitric acid on the amount of nitrates in the cadmium sulphate solution. In all of these tests an excess of cadmium metal was used and the cadmium sulphate solution formed produced better pigment than a solution in which excess metal was not used. In those cases in which nitrates were present in the cadmium sulphate solution additional improvements in the brightness, tinting strength, etc., of the pigment prepared therefrom resulted, as more fully pointed out in the above mentioned application Serial No. 187,665, it being understood that various expedients may be resorted to to provide nitrates during the calcination of the pigment.

Example II

A ratio of 1 part by weight of 42° Bé. nitric acid to 4.35 parts by weight of 60° Bé. sulphuric acid will produce after dilution a cadmium sulphate liquor containing a trace of nitrates, amounts of nitric acid less than that corresponding to this ratio yielding nitrate free solutions, and amounts of nitric acid greater than that corresponding to this ratio give increasing amounts of nitrates.

| | |
|---|---|
| Cadmium metal | 1812 grams |
| 42° Bé. nitric acid | 383 grams |
| 60° Bé. sulphuric acid | 1667 grams |
| Water | 4250 |
| Temperature 180°–212° F. | Neutral to methyl orange. |
| Nitrates | A trace. |

It is to be understood that various modifications and changes may be made without departing from the spirit of the invention. Different concentrations of cadmium sulphate solutions can, of course, be made and different concentrations of acid and temperatures can be used. Ordinarily, however, concentrations and temperatures of the order indicated will be used as it has been found that using dilute acids and boiling decreases the time necessary for dissolution of the cadmium metal. Preferably the amount of nitric acid used will be 10–30% of the sulphuric acid by weight.

The invention is applicable to the production of sulphide pigments generally. Either the so-called pure colors, or the lithopone type colors may be made. Other soluble sulphides such as sodium sulphide may be used in place of barium sulphide. Either the yellow pigment or the red (cadmium sulpho-selenide) cadmium pigments may be made.

Whenever the term "excess metal" is used in the specification of claims it is used to mean that a sufficient amount of metal is used such that a solution neutral to methyl orange containing no free acids results after all the metal is dissolved which is going to be dissolved.

This application is in part a continuation of Serial No. 739,813, filed August 14, 1934, and in part a continuation of Serial No. 187,665, filed January 29, 1938.

I claim:

1. The process of making a cadmium sulphide pigment which comprises reacting cadmium metal with a mixture of sulphuric acid, nitric acid and water until all of the $SO_4$ ions of the mixture are combined with cadmium and an acid-free, nitrate-free $CdSO_4$ solution neutral to methyl orange is formed, the cadmium metal being in excess of the stoichiometric ratio to the $SO_4$ of the mixture and the nitric acid being sufficient to effect rapid combination with cadmium of all of the $SO_4$ content of the mixture but insufficient to impart nitrates to the $CdSO_4$ solution and reacting the cadmium sulphate solution thus formed with a water soluble sulphide.

2. The process of claim 1 in which the soluble sulphide is barium sulphide.

3. The process of claim 1 in which the temperature of the reaction between the metal and the mixture of acids is from 180° F. to the boiling point of the solution.

4. The process of making cadmium sulphide pigments comprising reacting a cadmium sulphate solution with a water soluble sulphide, said cadmium sulphate solution being the product of the reaction of cadmium metal with a mixture of sulphuric acid, nitric acid and water until all of the $SO_4$ ions of the mixture are combined with cadmium and an acid-free, nitrate-free $CdSO_4$ solution neutral to methyl orange is formed, the cadmium metal being in excess of the stoichiometric ratio to the $SO_4$ of the mixture and the nitric acid being sufficient to effect rapid combination with cadmium of all of the $SO_4$ content of the mixture but insufficient to impart nitrates to the $CdSO_4$ solution.

JAMES J. O'BRIEN.